Patented Jan. 15, 1924.

1,481,012

UNITED STATES PATENT OFFICE.

HENRY E. KALUSOWSKI, OF WASHINGTON, DISTRICT OF COLUMBIA, ASSIGNOR TO J. SCHNARR & CO., OF ORLANDO, FLORIDA.

MATERIAL FOR SPRAYING VEGETATION.

No Drawing. Application filed April 14, 1921. Serial No. 461,378.

*To all whom it may concern:*

Be it known that I, HENRY E. KALUSOWSKI, a citizen of the United States, and resident of Washington, in the District of Columbia, have invented certain new and useful Improvements in Materials for Spraying Vegetation, of which the following is a specification.

The object of this invention is to provide an improved homogeneous composition for spraying vegetation and destroying undesirable organic forms, serving effectively as a fungicide and insecticide, and remaining homogeneous and ready for use for any ordinary period of time.

One of the most effective ingredients of such sprays is copper, an infinitesimal amount of which effectually eliminates certain forms of life. So far as I am aware, however, no permanent copper solution suitable in all respects for such a spray has been produced heretofore.

Most plants upon which sprays are used have a water-repellent surface which is not wet by most liquids, and hence spraying with many liquids has failed to produce the desired effects. Sometimes liquids which wet the foliage are not stable, and on this account the results are uncertain. Even recent Government publications recommend forming a sort of temporary emulsion and using it before it has time to settle or separate. Obviously, this course requires skill and judgment, and is clearly desirable to have a permanent mixture such that if sold by the barrel, for example, little or much may be used at any time with the certainty that the part used is identical with every part of what remains.

With these ends in view, a permanent solution of copper is intimately commingled with other materials to form a permanent emulsion. Excellent results have been obtained by dissolving, with heat, copper oleate in cresol, oleic acid, resin oil, and paraffine oil, adding to the product while warm a mucilaginous liquid formed of any suitable material, e. g., a water-soluble, viscous gum dissolved in hot water, and to the resultant mixture adding saponifying material, preferably caustic soda, to combine with the fatty matter and resin oil. By this means a highly satisfactory, permanent, copper-bearing emulsion is produced.

While the proportions are not invariable, and the steps and materials can be somewhat changed without material change in the results, I have used: 165 lbs. of copper oleate dissolved in a mixture of 9 gallons of oleic acid, 9 gallons of resin oil, $\frac{3}{4}$ gallons of cresol, $33\frac{1}{2}$ gallons of paraffine oil, adding to this mixture $3\frac{1}{4}$ lbs. of Karaya gum dissolved in 17 gallons of water, and finally adding 10 lbs. of caustic soda dissolved in 15 gallons of water, thus completing the composition or emulsion and forming a liquid which wets all ordinary vegetation, which is entirely stable, and which carries substantially the same percentage of copper as approved "Bordeaux mixtures."

This emulsion is not subject to the well known objections to Bordeaux mixture.

Karaya gum is a vegetable gum largely imported from India and is the product, for one source, at least, of a plant technically known as *Sterculia urens*. It is well known in commerce and to our Agricultural Department under the name Karaya gum.

The mixture in which the copper oleate is dissolved is a very effective solvent therefor, although none of the ingredients alone are satisfactory, the oleate being only sparingly soluble therein.

It has been found possible to substitute for gum glue, gelatine or other materials, but I prefer to use water-soluble viscous gum of some kind, and among these to employ such as are low in cost, the cost of some gums otherwise suitable being prohibitive.

Turpentine and other solvents have been tried by many people but so far as I know of them, each is for one reason or another undesirable.

What I claim is:

1. A permanently homogeneous, foliage-wetting, copper-bearing emulsion for spraying vegetation, having intimately commingled copper, oleate, saponified fatty oil, and water-soluble gum.

2. A spray liquid consisting of copper oleate dissolved in fatty acid, oil, and a phenol compound, all mingled with mucilaginous material and treated with saponifying alkali.

3. A spray liquid containing copper oleate dissovled in cresol, oleic acid, resin oil, and paraffine oil and mingled with a mucilaginous liquid and the whole treated with caustic soda.

4. A permanent emulsion spray consisting of 165 lbs. of copper oleate dissolved in a mixture of 9 gallons each of oleic acid and resin oil, ¾ of a gallon of cresol, and 33½ gallons of paraffine oil, the solution having added 3½ lbs. of Karaya gum dissolved in 17 gallons of water with heat, and lastly having added 10 lbs. of caustic soda dissolved in 15 gallons of water.

In testimony whereof I hereunto affix my signature.

HENRY E. KALUSOWSKI.